United States Patent [19]

Goad et al.

[11] Patent Number: 4,847,949

[45] Date of Patent: Jul. 18, 1989

[54] LID SUPPORT FOR FOOD WARMING VESSELS

[75] Inventors: Eugine W. Goad, Dayton; John V. Drube, Minneapolis, both of Minn.

[73] Assignee: Industrial Design & Engineering Associates, Rogers, Minn.

[21] Appl. No.: 270,817

[22] Filed: Nov. 14, 1988

[51] Int. Cl.⁴ ................................................ E05D 5/02
[52] U.S. Cl. ........................................ 16/252; 16/382; 16/DIG. 40; 220/85 CH
[58] Field of Search ................ 16/223, 252, 257, 259, 16/382, DIG. 40; 220/85 CH, 335

[56] References Cited

U.S. PATENT DOCUMENTS

| 626,023 | 5/1899 | Hoage et al. | 220/85 CH |
| 4,375,711 | 3/1983 | Franzen et al. | 16/252 |

Primary Examiner—Fred A. Silverberg
Attorney, Agent, or Firm—James V. Harmon

[57] ABSTRACT

A lid support is described for a food warming vessel which includes lid support arm comprising a channel with a pair of parallel vertical flanges connected by a center panel and a lid connector supported at the free end of the arm and extending downwardly between the flanges. The connector comprises a retaining member formed from sheet material with at least one recess for the handle of a cover with structure for securing the handle in the recess of the connector.

6 Claims, 1 Drawing Sheet

U.S. Patent    Jul. 18, 1989    4,847,949

LID SUPPORT FOR FOOD WARMING VESSELS

FIELD OF THE INVENTION

The present invention relates to food cooking and warming vessels and more particularly to covered vessels and to a provision for connecting the cover to a support arm.

BACKGROUND OF THE INVENTION

U.S. Pat. No. 4,375,711 describes a removable cover hinge for food containers in which the lid of the container is connected to the free end of a support arm composed of spaced apart metal rods by means of a loop at the end of the rods constructed to frictionally engage the handle of the cover. The frictional engagement is maintained by the bifurcated construction of the arm with a hook element at the end of the arm. The hook, however, did not always provide secure support for the cover. Moreover, the support arm was removably connected to the vessel which added to its complexity and manufacturing costs. One object is therefore to provide a more secure connection for the cover at the end of the support arm. Another object is to provide a new arm design which allows the cover to be securely supported and also facilitates cleaning even when the arm is permanently secured to a vessel or other support structure.

These and other more detailed and specific objects of the invention will be apparent in view of the following specification and claims wherein the figures and detailed description set forth preferred embodiments of the invention by way of example.

THE FIGURES

DETAILED DESCRIPTION OF THE INVENTION

Figure 1:
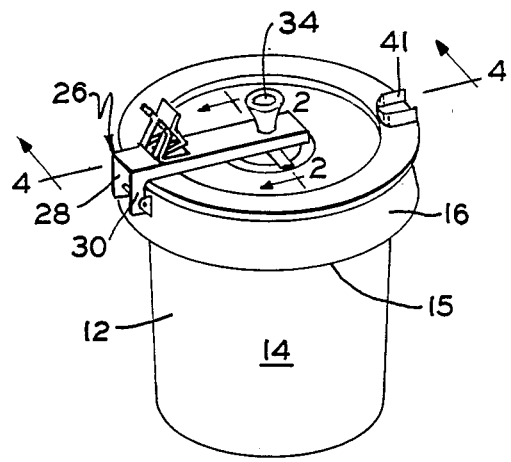
FIG. 1 is a vessel having a lid support in accordance with the invention.
Figure 2:
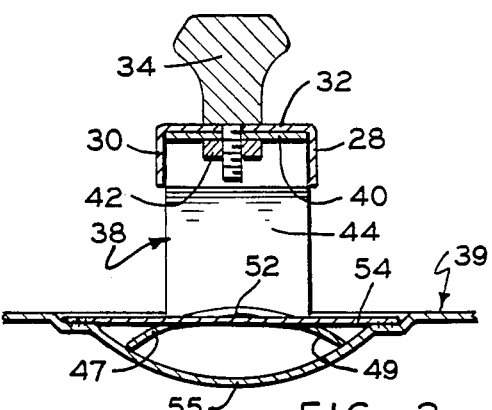
FIG. 2 is a cross-sectional view taken on line 2—2 of FIG. 1.

In FIG. 1 is shown a food warming or cooking vessel 14, in this case a cylindrical cooking vessel of the type used in a steam table which is particularly useful in warming and cooking foods in restaurants and cafeterias. The invention is, however, also used for cooking appliances used in the home. The vessel 14 is provided with a circular shoulder 15 at its upper end which defines the lower edge of an enlarged upper portion 16 having an outwardly turned rim 18 at its upper edge. Affixed as by welding, screws or other fasteners to the upper edge of the vessel 14 and connected at its upper edge to the rim 18 is a bracket 20, the upper end of which extends over the rim 18. The bracket 20 includes outwardly projecting flanges 22 which support a hinge or pivot 24 for a cover support handle 26. The cover support handle 26 comprises a channel including parallel longitudinally extending spaced apart flanges 28 and 30 connected together by means of a top panel or web 32 to which is connected a knob 34 for raising and lowering the free end of the handle 26 at the right in FIG. 4 up or down about the pivot 24. The center panel 32 of the handle 26 can also be used as a support for a clip or bracket 36 used to hold a sign to designate the food contained in the vessel 14.

Figure 3:
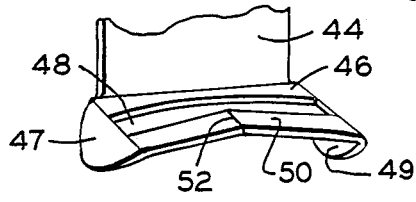
FIG. 3 is a perspective view of the lower end portion of the connector of FIG. 2.
Figure 4:
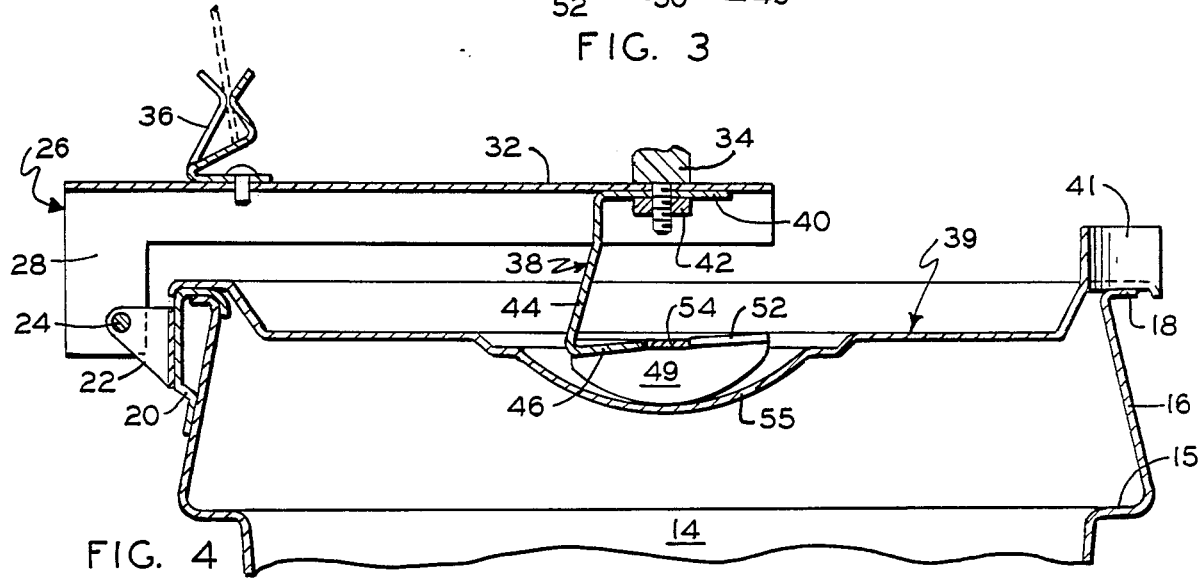
FIG. 4 is a vertical cross-sectional view taken on line 4—4 of FIG. 1.

Connected to the free end of the arm 28 and specifically to the lower surface of the web 32 is a connector 38 for a cover 39. Connector 38 is formed from sheet metal in this case and includes an upper horizontally disposed portion 40, a vertically disposed center section 44 and a horizontally disposed end section 46 that defines a retaining member which includes a transversely extending slot or recess 48 for horizontally disposed bar-shaped handle 54 that is welded at each end to the cover 39. The slot 48 has parallel spaced apart side walls that engage corresponding side edges of the handle 54. Thus, during use the handle 54 is securely engaged in the slot 48 as shown in FIG. 4. On the side of the slot 48 nearest the observer as seen in FIG. 3, the horizontal portion of the connector 46 is bent upwardly at 50 and at its highest point is a separation line, i.e. a crack 52 which is normally somewhat above the elevation of the rest of the plate portion 46. On each side of the plate 46 are downwardly deflected wings 47 and 49 with arcuate outer edges engaged in a well 55 of the cover 39. During use the raised portion 50 can be deflected downwardly by finger pressure as the plate portion 46 is slid beneath the handle 54. As the raised portion 50 slides beneath the handle 54 it will be deflected downwardly by a small amount. When the handle 54 enters the recess 48 it will snap upwardly, thereby securely locking the cover onto the free end of the cover support arm 26. The connector 38 can be secured to the handle 26 in any suitable manner as by means of a nut 42 screwed onto a part of the knob 34 which extends through the handle and horizontal connector portion 40.

The cover 39 is preferably provided with an opening for a spoon as shown at the left in FIGS. 1 and 4. This opening is surrounded by means of a vertically disposed U-shaped shield for deflecting material away from the opening surrounded by the flange 41 in the cover 39. In this way, if some fluid accumulates on the cover 39 it will not flow into the vessel and contaminate the food.

Figures 5, 6, 7:
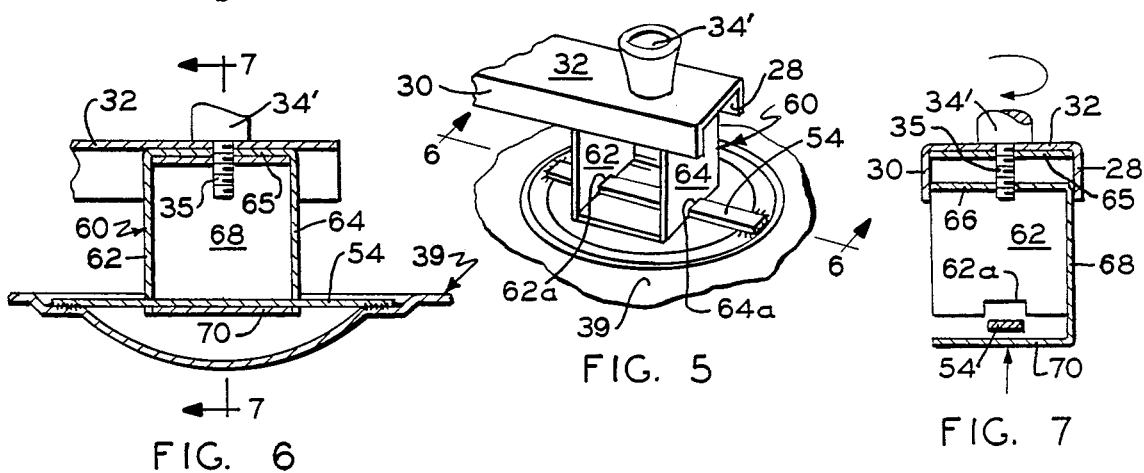
FIG. 5 is a perspective view of another form of connection with the invention.
FIG. 6 is a vertical cross-sectional view taken on line 6—6 of FIG. 5.
FIG. 7 is a vertical cross-sectional view taken on line 7—7 of FIG. 6.

Refer now to FIGS. 5–7. As shown in the figures, a lifting knob at the free end of the cover support arm 26 is in this case designated 34'. Extending downwardly from the center panel 32 and located between the flanges 28 and 30 is another form of connector 60. The connector 60 in this case includes a U-shaped sheet metal connector member comprising vertically disposed longitudinally spaced apart plates 62 and 64 connected by means of an integral horizontally disposed center portion 65. To receive the handle 54, there are provided a pair of recesses 62a and 64a in the panels 62, 64. These recesses extend upwardly from the lower edge of the panels as clearly shown in FIG. 7 and include laterally spaced apart parallel vertically disposed side walls that engage the side edges of the handle 54. The knob 34' is journalled for rotation in the center panel 32 of the arm 26 and includes a downwardly extending threaded stem 35 which is screw-threaded into an opening in an arm 66 of a generally C-shaped holder formed from sheet metal and including upper and lower horizontally disposed arms 66 and 70 in an integral vertically disposed connecting web 68.

To mount the cover 39 on the arm 26, the knob 34' is turned to lower the holder 66–70 to the position of FIG. 7. The handle 54 is then inserted into the recesses 62a, 64a and the knob is turned in the opposite direction to raise the holder panel 70 until it is raised to the position shown in FIG. 6, thereby securely retaining the handle 54 and cover 39 on the free end of the arm 26. To remove the cover, the knob 34' is turned in the opposite direction and the reverse operations are performed.

Many variations of the present invention within the scope of the appended claims will be apparent to those skilled in the art once the principles described above are understood.

What is claimed is:

1. A lid support for a cooking vessel having a lid, including a lid support arm pivotally connected at one end to a hinge member located adjacent the upper edge of said vessel and having a free end positioned above the lid, a lid connector at the free end of the lid support arm, said connector extending downwardly from the support arm and said lid connector having a recess therein of predetermined width corresponding to the width of a handle on the lid, said recess being adapted to fit around the handle and having side walls engaging the side edges of the handle, said lid connector including means to secure the handle in the recess with the side edges of the recess in engagement with the side edges of the handle to securely retain the handle and lid on the free end of the support arm, the connector is formed from sheet metal having a horizontally disposed plate portion, said recess comprises an opening extending laterally from one side of the plate portion to the other and includes a raised section adapted to pass under the handle and to snap into engagement with the handle to secure the handle in position with a snap fit to the connector.

2. The lid support of claim 1 wherein the connector includes a pair of outwardly and downwardly projecting wings at the opposite ends of the recess, said wings having arcuate outer edges to engage a portion of the cover below the handle.

3. A lid support for a cooking vessel having a lid, including a lid support arm pivotally connected at one end to a hinge member located adjacent the upper edge of said vessel and having a free end positioned above the lid, a lid connector at the free end of the lid support arm, said connector extending downwardly from the support arm and said lid connector having a recess therein of predeteremined width corresponding to the width of a handle on the lid, said recess being adapted to fit around the handle and having side walls engaging the side edges of the handle, said lid connector including means to secure the handle in the recess with the side edges of the recess in engagement with the side edges of the handle to securely retain the handle and lid on the free end of the support arm, the connector includes a pair of spaced apart vertically disposed plates and one such recess is provided at the lower edge of each said plate and said means to secure the handle in the recess comprises a movable holder member including a portion positionable beneath the handle and below said recesses and being movable to a raised position for releasably retaining the handle in place within said recesses.

4. The lid support of claim 3 wherein the holder includes a horizontally disposed upper portion, a retaining element is connected to the upper horizontally disposed portion for raising and lowering the holder to lock the handle in place within said recesses.

5. The lid support of claim 4 wherein the retaining element comprises a knob journalled on the arm and having a threaded extension screw-threaded into the horizontal upper portion of the holder so that by turning the knob the holder can be lowered on raised for securing the handle of the cover in the recesses.

6. The lid support as in either claim 2 or claim 4 wherein said arm comprises a channel having a pair of parallel vertical flanges and an elongated normally horizontally disposed center panel connecting the flanges together.

* * * * *

UNITED STATES PATENT AND TRADEMARK OFFICE
CERTIFICATE OF CORRECTION

PATENT NO. : 4,847,949

DATED : Jul. 18, 1989

INVENTOR(S) : Eugine W. Goad et al.

It is certified that error appears in the above-identified patent and that said Letters Patent is hereby corrected as shown below:

In column 4, claim 6, line 1, change "2" to --1-- and "4" to --3--.

Signed and Sealed this

Twenty-ninth Day of May, 1990

Attest:

HARRY F. MANBECK, JR.

*Attesting Officer*   *Commissioner of Patents and Trademarks*